UNITED STATES PATENT OFFICE.

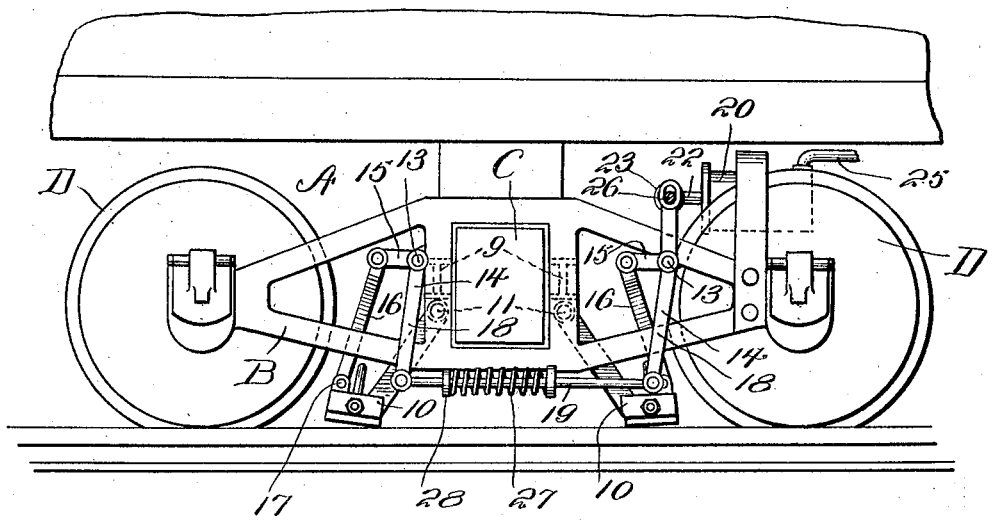
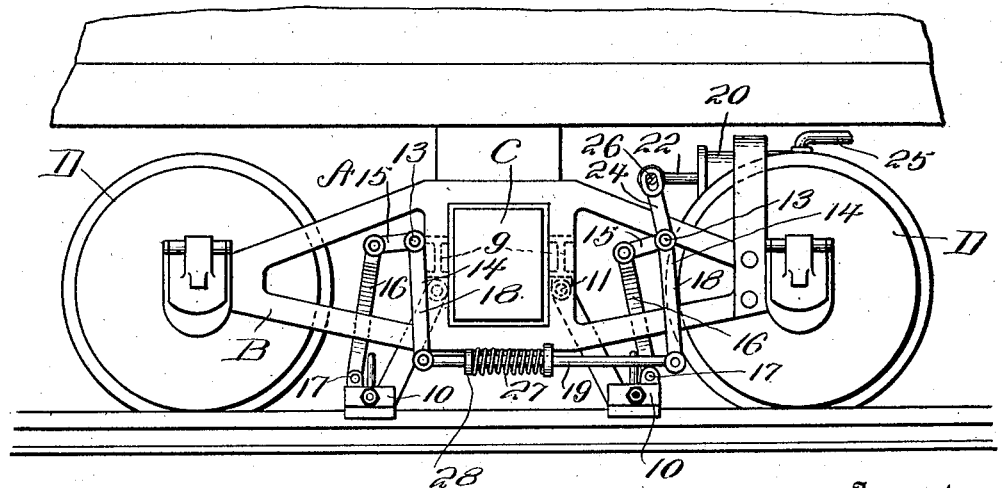

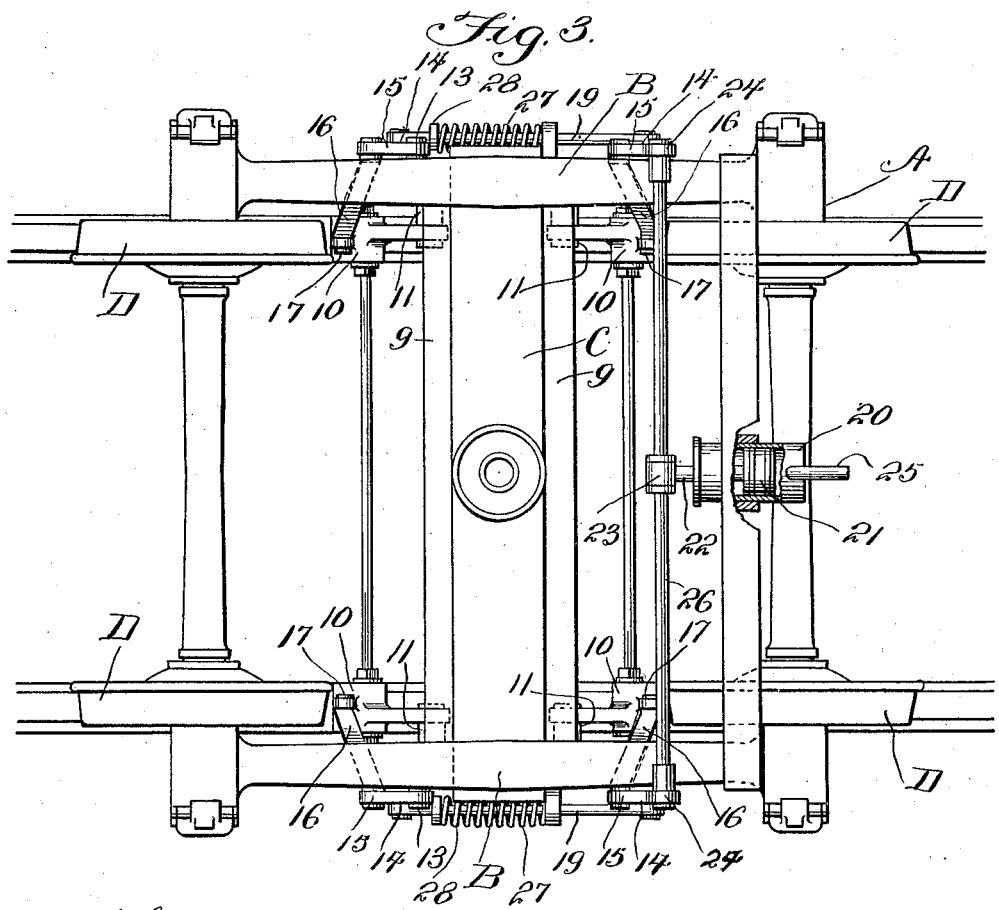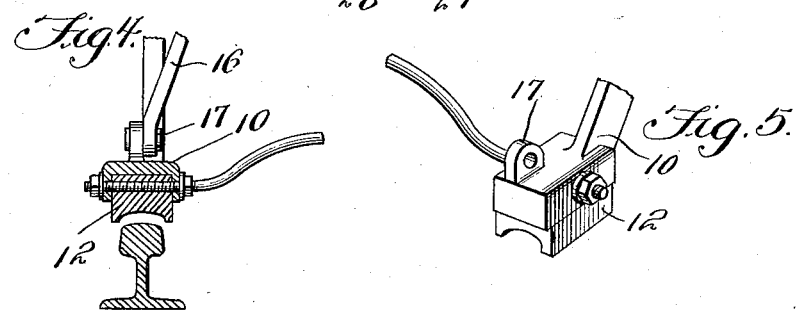

RUSSEL JONES, OF PONTIAC, MICHIGAN.

RAIL-ENGAGING BRAKE.

1,388,047.  Specification of Letters Patent.  Patented Aug. 16, 1921.

Application filed February 8, 1919, Serial No. 275,774. Renewed May 31, 1921. Serial No. 473,780.

*To all whom it may concern:*

Be it known that I, RUSSEL JONES, a citizen of the United States, residing at Pontiac, in the county of Oakland and State of Michigan, have invented new and useful Improvements in Rail-Engaging Brakes, of which the following is a specification.

This invention relates to railway brakes and has for its object the provision on each truck of a railway vehicle of a plurality of brake members movable into engagement with the rails, these brake members being arranged in pairs on the sides of the truck and the members in each pair being oppositely disposed whereby to exert an efficient braking action regardless of the direction of travel.

An important object is the provision of a brake mechanism of this character in which the brakes are set by introducing compressed air within a cylinder in which is movable a piston connected by a link and lever arrangement with the pivoted brake members whereby all the brake members may be simultaneously set.

Another object is the provision of a brake mechanism of this character in which springs are provided for automatically releasing the brakes when the air pressure is relieved.

An additional object is the provision of a brake mechanism of this character which will be comparatively simple and inexpensive in manufacture and installation, highly efficient and durable in use and a general improvement in the art.

With the above and other objects and advantages in view, the invention consists in the details of construction to be hereinafter more fully described and claimed, and illustrated in the accompanying drawing, in which:—

Figure 1 is a side elevation of a truck having my brake mechanism applied thereto, the brakes being in release position.

Fig. 2 is a similar view showing the brakes in their set position.

Fig. 3 is a top plan view and Figs. 4 and 5 are detail views.

Referring more particularly to the drawings, the letter A designates a truck of ordinary construction including the side frame B, a bolster C and provided with the usual wheels D.

In carrying out my invention I provide upon each side of the truck A a pair of brake members 10 pivotally connected with the bolster C as shown at 11 and arranged in divergent relation. At their free ends, the brake members 10 are provided with detachable shoes 12 properly shaped for engagement upon the rails. Pivoted upon each frame B as shown at 13 are angle levers 14 to the arms 15 of which are pivotally connected links 16 which in turn are pivotally connected with the lower ends of the brake members 10 as shown at 17. The depending arms 18 of the angle levers 14 are connected by a connecting rod 19 whereby the angle levers will have simultaneous movement.

In order that the brakes may be moved to operative position, I provide upon some suitable portion of the truck a cylinder 20 within which is movable a piston 21 from which extends a piston rod 22 pivotally connected as shown at 23 with the free end of an upwardly extending arm 24 formed on one of the angle levers 14. A pipe 25 leading from any suitable source of compressed air communicates with the interior of the cylinder 20 to the rear of the piston 21 and may be provided with any suitable form of control valve, not shown, whereby the supply of air admitted to the cylinder may be regulated. In order that the brake members on both sides of the truck may be operated simultaneously, it is preferable that the free ends of the arms 24 be connected by a suitable rod 26 to which the piston rod 22 is connected.

In order to provide means whereby the brake members 10 will be normally held in retracted position out of engagement with the rails, I provide at each side of the truck upon the connecting rod 19 a spring 27 which has one end bearing against a collar 28 on the rod and its other end bearing against an apertured ear extending from the bolster C. The natural resilience of the springs 27 will hold the angle levers 14 in such a position that the lower ends of the brake members 10 will be elevated slightly as will be apparent from an inspection of the drawings.

In the use of the device, when it is desired to set the brakes, it is merely necessary that the operator manipulate the control valve to permit compressed air to enter the cylinder 20 at the rear of the piston 21, whereupon the piston 21 will be moved outwardly resulting in swinging movement of the angle levers 14 in a downward direction. As the arms 15 are swung downwardly the links 16 will force the lower ends of the brake members 10 downwardly into engagement with the rails. A very efficient braking action will thus be produced.

While I have shown and described the preferred embodiment of the invention, it will of course be readily understood that I reserve the right to make such changes in the form, construction and arrangement of parts as will not depart from the spirit of the invention nor the scope of the subjoined claims.

I claim:—

1. A brake mechanism for railway trucks comprising a pair of divergently arranged downwardly extending brake members pivoted upon each side of the truck, rail engaging shoes on the lower ends of said brake members, a pair of angle levers pivoted upon each side of the truck, links pivotally connected with the lower ends of said brake members and with the corresponding arms of said angle levers, a connecting rod connecting the other arms of said angle levers whereby said angle levers will have simultaneous movement, an auxiliary arm formed on one angle lever at each side of the truck, a rod connecting the free ends of said auxiliary arms, means for holding said brake members normally elevated and means for exerting a pull upon said rod.

2. A brake mechanism for railway trucks comprising a pair of divergently arranged downwardly extending brake members pivoted upon each side of the truck, rail engaging shoes on the lower ends of said members, a pair of angle levers pivoted upon each side of the truck, links pivotally connected with the lower ends of said brake members and with said angle levers, a connecting rod connecting said angle levers whereby the latter will have simultaneous movement, and means for moving said angle levers.

In testimony whereof I affix my signature.

RUSSEL JONES